(12) United States Patent
Van Belkom

(10) Patent No.: US 8,118,180 B2
(45) Date of Patent: Feb. 21, 2012

(54) SYSTEM FOR SUPPORTING OBJECTS

(75) Inventor: Arnoldus Van Belkom, Spannum (NL)

(73) Assignee: Lankhorst Special Mouldings B.V., Sneek (NL)

(*) Notice: Subject to any disclaimer, the term of this patent is extended or adjusted under 35 U.S.C. 154(b) by 383 days.

(21) Appl. No.: 12/294,173

(22) PCT Filed: Mar. 23, 2007

(86) PCT No.: PCT/NL2007/050125
§ 371 (c)(1),
(2), (4) Date: Feb. 19, 2009

(87) PCT Pub. No.: WO2007/111506
PCT Pub. Date: Oct. 4, 2007

(65) Prior Publication Data
US 2009/0308824 A1    Dec. 17, 2009

(30) Foreign Application Priority Data
Mar. 24, 2006   (NL) ..................................... 1031441

(51) Int. Cl.
*A47G 29/00* (2006.01)
(52) U.S. Cl. .................. 211/85.22; 211/120; 211/59.3; 211/43
(58) Field of Classification Search ............ 211/40, 211/41.12, 40.13, 41.14, 41.17, 43, 120, 211/15, 7, 51, 59.3, 59.2, 85.18, 85.22, 41.13, 211/44, 41.18, 175, 184; 206/389, 448, 451; 248/346.06, 346.07, 346.5, 346.01, 346.03; 188/4 R, 36, 37; 414/911
See application file for complete search history.

(56) References Cited

U.S. PATENT DOCUMENTS

| | | | | |
|---|---|---|---|---|
| 1,617,839 A | * | 2/1927 | Fennell | 188/32 |
| 2,771,162 A | * | 11/1956 | Marsh | 188/32 |
| 2,773,564 A | * | 12/1956 | Garard | 188/32 |
| 2,797,774 A | * | 7/1957 | Eckhart | 188/32 |
| 3,476,260 A | | 11/1969 | Jay | |

(Continued)

FOREIGN PATENT DOCUMENTS
FR            2847652 A      5/2004
(Continued)

*Primary Examiner* — Darnell M Jayne
*Assistant Examiner* — Devin Barnett
(74) *Attorney, Agent, or Firm* — Pearne & Gordon LLP

(57) ABSTRACT

A system (1) for supporting a rollable object (4), such as a cylindrical container. The system comprises at least one elongated rail (2) and at least one supporting part. The rail (2) has a contact surface (6) for bearing on a base, and is furthermore provided, along at least two sides, with an at least partly profiled surface (5) for holding a supporting part (3) in position at least in a longitudinal direction of said elongated rail (2). The supporting part (3) comprises a supporting surface (7) for preventing a movement of the object (4) in a horizontal direction, and, optionally, for supporting the object (4) in a vertical direction, and a contact surface (8) for bearing on the rail (2) and/or the base. The supporting part (3) further comprises a passage (9) for receiving at least a part of the rail (2). This passage (9) is provided with an inner wall which is at least partly provided with a profiled surface (10) complementary to the profiled surface (5) of the two sides of the rail (2), for at least partly transmitting a force, applied to the supporting part in said longitudinal direction, to the rail (2).

19 Claims, 3 Drawing Sheets

U.S. PATENT DOCUMENTS

| | | | |
|---|---|---|---|
| 4,685,846 A * | 8/1987 | Golay et al. | 410/49 |
| 4,833,442 A * | 5/1989 | Von Heck | 340/427 |
| 4,970,884 A * | 11/1990 | Solow | 70/209 |
| 5,113,976 A * | 5/1992 | Noakes | 188/32 |
| 5,199,283 A | 4/1993 | Chen | |
| 5,265,449 A * | 11/1993 | Rashleigh | 70/18 |
| 5,653,132 A | 8/1997 | Coto | |
| 5,713,228 A | 2/1998 | Huang | |
| 5,884,885 A * | 3/1999 | Schmidt, Jr. | 248/346.01 |
| 5,927,443 A | 7/1999 | Collins | |
| 6,227,512 B1 * | 5/2001 | Andre et al. | 248/346.01 |
| 6,290,029 B1 * | 9/2001 | Gubler et al. | 188/36 |
| 6,539,758 B2 | 4/2003 | Meekma et al. | |
| 6,550,741 B1 * | 4/2003 | Cottone | 248/678 |
| 6,725,979 B1 * | 4/2004 | Snook | 188/32 |
| 6,863,481 B2 * | 3/2005 | Pingel | 410/30 |
| 7,036,637 B1 * | 5/2006 | Wiens | 188/36 |
| 7,299,902 B2 * | 11/2007 | Thorpe | 188/32 |
| 2004/0045774 A1 * | 3/2004 | D'Alessio | 188/4 R |
| 2004/0120784 A1 * | 6/2004 | Sargent | 410/20 |
| 2006/0144649 A1 * | 7/2006 | Jette | 188/4 R |
| 2009/0035088 A1 * | 2/2009 | Powers et al. | 410/30 |
| 2010/0140024 A1 * | 6/2010 | Wolfram | 188/32 |
| 2010/0170754 A1 * | 7/2010 | Brooks et al. | 188/32 |

FOREIGN PATENT DOCUMENTS

| | | |
|---|---|---|
| WO | WO9744220 A | 11/1997 |
| WO | WO 9744220 A1 * | 11/1997 |

* cited by examiner

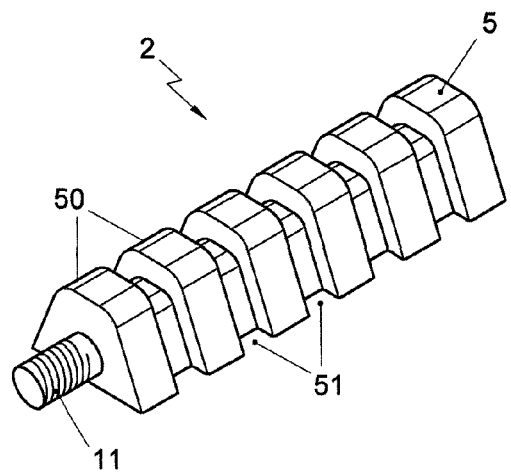
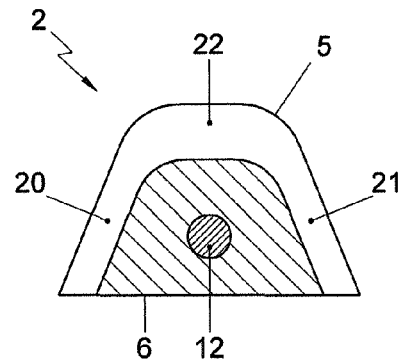
Fig. 4                    Fig. 5
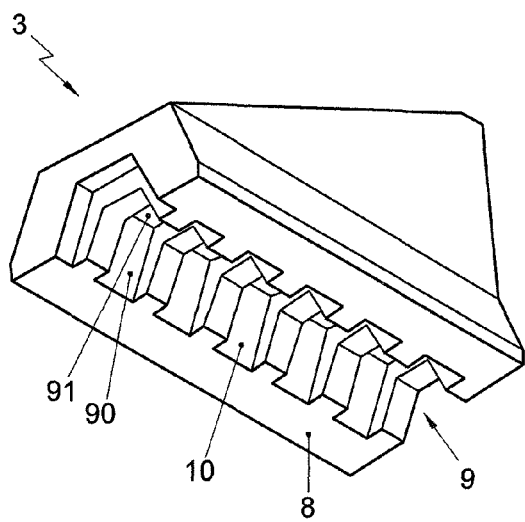
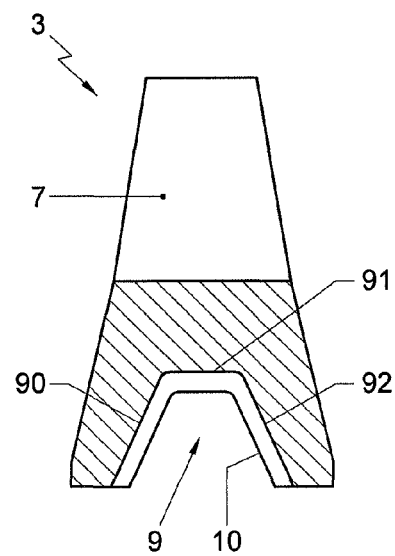
Fig. 6                    Fig. 7

SYSTEM FOR SUPPORTING OBJECTS

FIELD AND BACKGROUND OF THE INVENTION

The invention relates to a system for supporting rollable objects. The invention also relates to a supporting part for use in such a system and to a rail for use in such a system.

Systems for supporting rollable objects are generally known, for instance for storing rolls of steel plate or foils. Characteristic of systems for supporting rollable or tiltable objects is that, optionally in addition to vertical support, they offer support to an object in horizontal direction, in order to prevent tilting and/or rolling away. The known systems comprise several supporting parts and rails, the supporting parts serving for supporting the object while the rails are used for positioning the supporting parts.

One of the requirements a system for supporting rollable objects needs to meet is that it does not seriously damage the surface of the object to be supported.

Known are supporting parts provided with a supporting surface for supporting an object, and a contact surface for transmitting the forces to the rail. The supporting part is wedge-shaped in that the supporting surface and the contact surface are at a mutual angle. An advantage of an oblique supporting surface is that it can absorb the forces both in the vertical and in the horizontal direction. The contact surface is provided with a toothing for positioning the supporting part in the rail. Such supporting parts, in any case their supporting surfaces, are typically manufactured from plastic. The plastic used has a relatively low E-modulus so that, when loaded, the supporting part conforms to some extent to the contour of the object to be supported. As a result, the chance of peak loads on the object to be supported, and, hence, the chance of damage to this object decreases.

These known supporting parts are arranged in a steel rail. This rail has an elongated shape, and comprises a metal U-section, placed with the open side upwards. In the U-section, cross partitions are welded. The supporting parts are dimensioned such that width-wise, they fit exactly in the rail, while the toothing fits over the cross partitions into the U-section.

For supporting, for instance, a roll of steel plate, two or more rails are arranged parallel, side-by-side, perpendicular to the longitudinal axis of the object to be supported. Per rail, two supporting parts are arranged with the oblique sides facing each other. The supporting parts thus form a recess, as it were, in which a roll or cylinder remains, by itself, at the deepest point. In the direction parallel to the longitudinal direction of the rail, the supporting parts are held in place by the cross partitions, and, in a direction at an angle to the longitudinal direction of the rail, by the walls of the U-section.

The weight of the roll is transmitted via the supporting parts to the rail, which bears on the base. As the roll bears on the oblique supporting surfaces of the supporting parts, also, a force in the horizontal direction is applied to the supporting parts, parallel to the longitudinal direction of the rail. These forces are transmitted via the cross partitions of the rail, and are opposite for two supporting parts placed in the same rail. Thus loaded, the supporting parts are pressed apart, as it were. However, as the supporting parts are interconnected via the rail, the opposing forces eliminate one another and the system as a whole is in rest. Hence, the blocks and the rail need not be solidly anchored to the base.

A drawback of such a system is that the edges of the metal rail can easily damage the relatively soft plastic, and/or can bend easily when they are inadvertently loaded in an incorrectly manner. This may for instance happen when an object is placed on the rail instead of on a supporting part. Further, welding a large number of cross partitions in a rail is labour-intensive and, hence, an expensive matter.

From international patent application WO 97/44220, another system for supporting rollable objects is known, which comprises one or more plastic connecting elements (or rails) on which two wedge-shaped plastic supporting parts can be placed.

The rails are formed as toothed racks, provided with angular teeth. The wedge-shaped supporting parts are provided, at the underside, with a groove so that they can be placed over the rail. The supporting parts are connected to the rail via toothings provided on the top of the grooves, which fit into the teeth of the rails. A drawback of the system known from this PCT publication is that the toothing deforms easily when loaded. The toothing of the rails must be widely dimensions in order to absorb the forces from the supporting parts without deforming. However, as a result, the toothing becomes relatively coarse. The coarse toothing does not allow precise positioning of the supporting parts related to the object to be supported.

SUMMARY OF THE INVENTION

It is a general object of the invention to provide an improved system for supporting rollable objects. In particular, it is an object of the invention to provide a system for supporting rollable objects, which can be accurately adapted to the sizes of the objects to be supported.

To that end, the invention provides a system according to claim 1.

Such a system enables an accurate adjustment, because the at least one rail is provided, along at least two sides, with an at least partly profiled surface. In addition, the passage of the at least one supporting part is provided with a complimentary profiled surface. When the supporting part has been placed on the rail, this enables the profiled surfaces of the rail and the supporting part to intermesh along the at least two sides of rail.

As the contact surface between the rail and the supporting part runs along at least two sides, the force is distributed over a larger surface, thereby allowing a more finely dimensioned profiling.

As a result, the distance between two successive projections in the profile can be maintained to be relatively small, so that the supporting parts can be shifted in small steps, and can be accurately positioned relative to the objects to be supported.

The invention also provides a rail according to claim 20, a supporting part according to claim 21 and a storage space according to claim 22. Specific embodiments have been laid down in the dependent claims.

BRIEF DESCRIPTION OF THE DRAWINGS

These and other aspects as well as effects and details associated with the invention are described in the following, albeit merely by way of example, with reference to an exemplary embodiment and the appended claims.

FIG. 4 shows a schematic perspective representation of an example of an embodiment of a part of a rail according to the invention;

FIG. 5 shows a schematic cross-section of the rail of FIG. 4, at the location of a groove between two teeth and at an angle to the longitudinal axis of the rail;

FIG. 6 shows a schematic, perspective representation of an example of an embodiment of a supporting part according to the invention, and FIG. 7 shows a schematic cross-section of the supporting part of FIG. 6.

DETAILED DESCRIPTION

Figure 1:
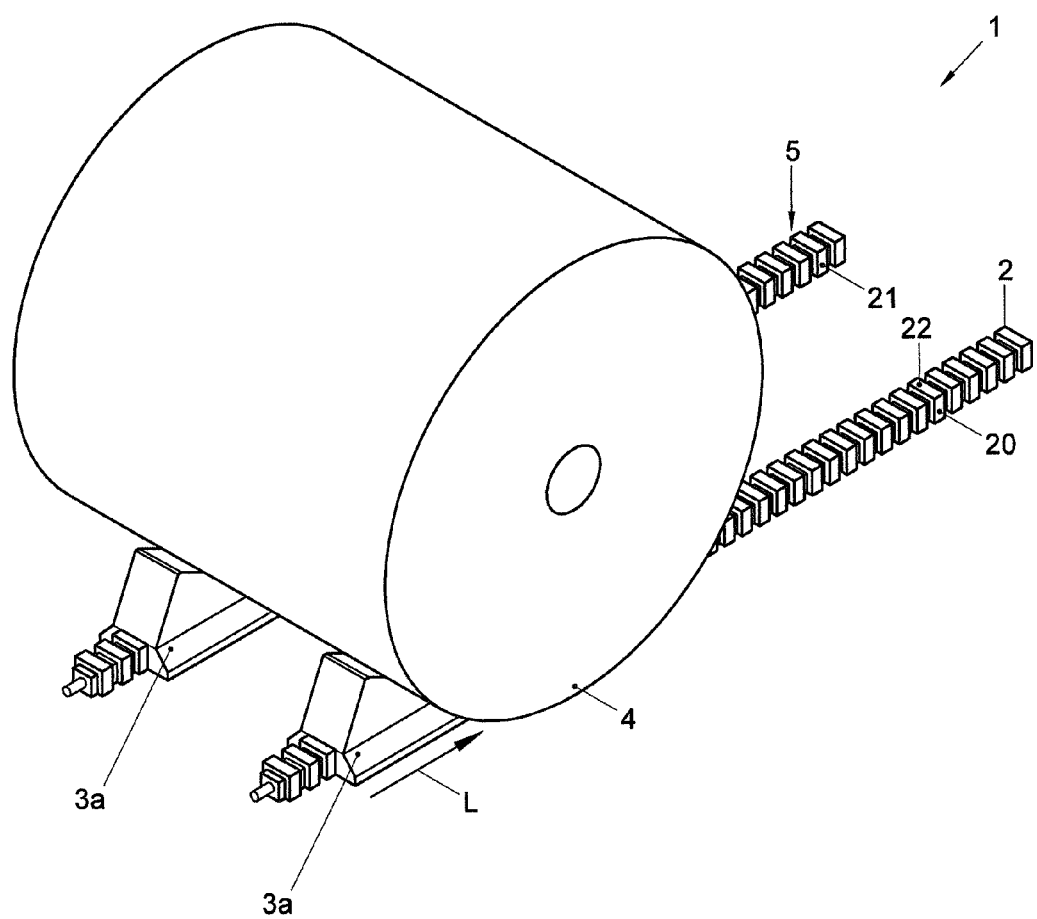
FIG. 1 shows a schematic, perspective representation of an example of an embodiment of a system according to the invention.
Figure 2:
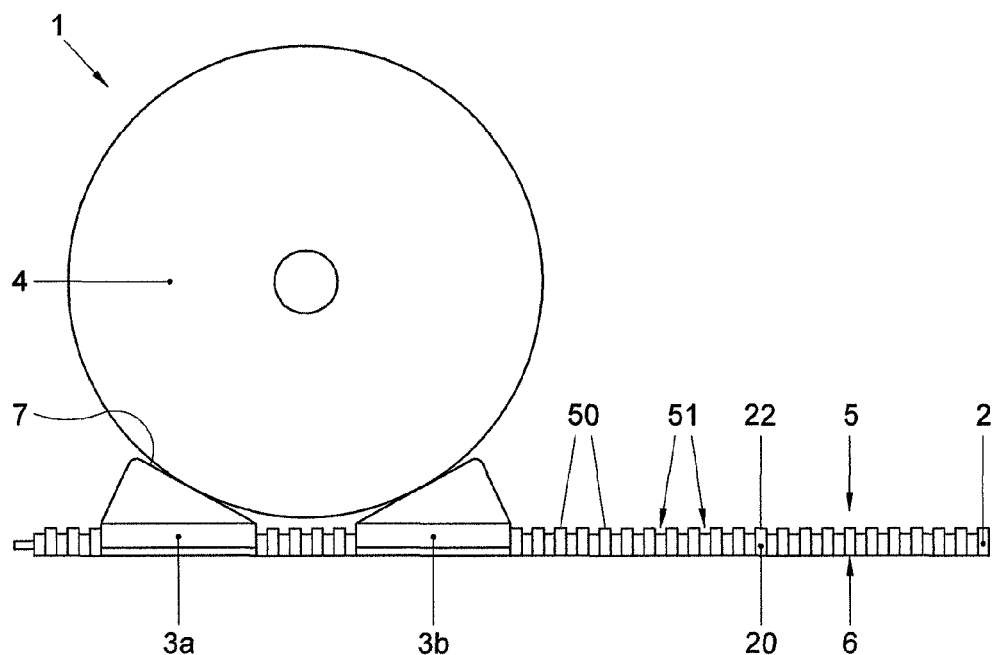
FIG. 2 shows a schematic side view of an example of an embodiment of a system according to the invention.
Figure 3:
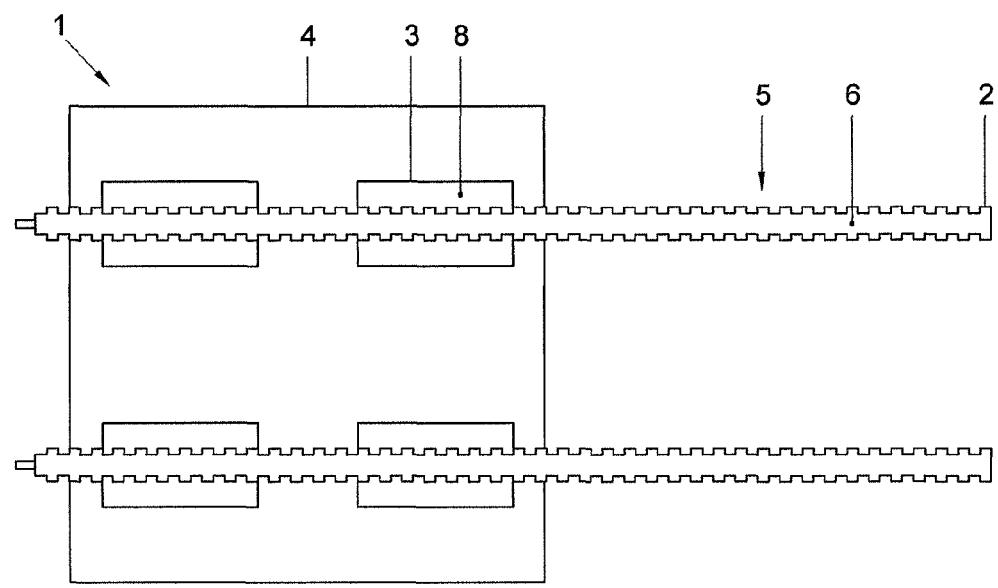
FIG. 3 shows a schematic bottom view of an example of an embodiment of a system according to the invention.

FIG. 1 shows an example of an embodiment of a system 1 according to the invention. FIGS. 2 and 3 show a side view and a bottom view, respectively, of the system shown in FIG. 1. The system 1 comprises two elongated rails 2 which, in FIG. 1, are positioned in parallel relation. The system 1 further comprises two pairs 3a, 3b of supporting parts. Each pair 3a, 3b has a supporting part on a first one of the rails 2 and a supporting part on a second rail 2. The two pairs of supporting parts 3a, 3b support a cylindrical container 4, and are held in position at least parallel to the longitudinal direction of the elongated cylinder by the rails 2. In the example shown, a force acting on the supporting parts 3a, 3b perpendicular to the longitudinal direction L of the rails 2 is transmitted to the rails 2 or the base via a contact surface 8 and/or sidewalls 90, 91, 92 of a passage 9 through the supporting part. Accordingly, the supporting part 3a, 3b is held in position in directions perpendicular to the longitudinal direction L by the respective rail 2. (Here, the rail 2 can be anchored to the base or to a sidewall of the space in which the rail 2 is present in order to hold the rails 2 in position).

A force, acting in the longitudinal direction L of the rail 2 on the supporting part 3a, 3b, is transmitted to rail 2 via a profiling 5 which extends along at least two sides over the rail 2. In the example shown, the profiling 5 extends over the longitudinal sides 20, 21 and the top side 22 of the rail 2.

As shown in further detail in FIGS. 6 and 7, the supporting parts 3a, 3b are each provided with a passage 9. The rail 2 can be received in the passage 9. The passage 9 is provided with a profiling 10 that is complementary to the profiling 5 of the rail 2, i.e., projecting parts of the profiling 10 fit in sunken parts of the profiling 5, and vice versa. Therefore, in mounted condition, projecting parts of one profiling accordingly extend into the recesses of the other profiling and are contact surfaces between the projecting parts of the two profilings 5, 10. Over these contact surfaces, which extend radially relative to the rail, the force in the longitudinal direction of a supporting part 3a, 3b, can be transmitted to the rail 2.

As the rail 2 is provided with a profiled surface along at least two sides, the projecting parts of the profiling 5 extend along a relatively large part of the circumference of a rail 2. The projecting parts therefore need not reach very far from the rail for achieving a desired contact surface. As the projecting parts, with the contact surface remaining the same, need reach less far, they can be dimensioned at their base to be relatively thin without increasing the risks of damage. The relief of the profile 5 is of smaller dimension and projects less far from the core of the rail. The distance in the longitudinal direction between the successive projecting parts and between the projecting parts can therefore also be shorter, and hence, a smaller pitch can be obtained. Owing to the smaller pitch, the supporting parts can be positioned more accurately.

This is of importance in particular when storing, for instance, rolls of steel plate. As the amount of steel plate, and hence the amount of rolled-up steel plate, differs per customer, these rolls have a mutually differing diameter. Therefore, upon storing, the supporting means are to be adapted to each roll.

FIG. 4 schematically shows an example of a rail 2 of a system 1 according to the invention, and FIG. 5 shows, at the location of the groove 51 between two teeth 50 and at an angle to the longitudinal axis of the rail 2, a schematic cross-section of the rail 2 from FIG. 4. The rails 2 as shown in FIG. 1 are provided along three sides 20-22 with a continuously profiled surface 5, for positioning the supporting parts 3. A force in the longitudinal direction L can be transmitted along three longitudinal sides of the rail 2, from the supporting parts 3 onto the rail 2. At the bottom side, the rails 2 are provided with a contact surface 6 for bearing on a base.

FIG. 6 shows a supporting part 3 of a system 1 according to the invention, and FIG. 7 shows a cross-section of this same supporting part 3. Each supporting part 3 is provided with a supporting surface 7 for preventing a movement of a container 4 in a horizontal direction, and for supporting a container 4 in a vertical direction. In addition, the supporting parts 3 are provided, at the underside, with a contact surface 8 for bearing on the base, and a passage 9 for placing the supporting part 3 over a rail 2. The passage 9 is defined by an inner wall of the supporting part, and is provided with a profiled surface 10, complementary to the profiled surface 5 of the at least two sides of the rail 2, for at least partly transmitting a force applied to the supporting part in the longitudinal direction, to the rail 2. In the example shown, the passage 9 is open at the underside, so that the rail 2 can be received in the passage 9 by placing the supporting part 3 from above on the rail 2.

In a further embodiment of a system according to the invention, a supporting part 3 can also fully bear on a rail 2, for instance in that, next to the passage, the supporting part does not reach as far as the ground surface, or in that, at the underside, the rail continues below the contact part of the supporting surface. The supporting parts 3 can also be adapted, as to the form of their contact surface 8, to a load to be supported. For instance, a supporting part can continue towards the underside for guiding the vertical force to the base in a stable manner, or a supporting part can be dimensioned to be extra wide so as to render the use of several parallel supporting parts superfluous. A supporting part can also be provided with, for instance, two passages for receiving two rails.

The supporting surface 7 of supporting parts 3 descends from a higher side to an opposite, lower side of the supporting part 3, providing the supporting parts 3 with a wedge-shape. Here, the supporting surface 7 can form a surface but can also be adapted to the shape of the object to be supported. For instance, a hollow, curved supporting surface that links up with the surface of a cylindrical container 4 can increase the surface with which the container 4 actually makes contact, and thus reduce the risk of, for instance, peak load.

The supporting parts 3 in FIG. 1 are placed, per two, on the rails 2, with the low sides facing each other, and with the high side facing away from each other for forming a cup-shaped opening for accommodating a rollable object. The advantage of such a set-up is that, in a simple manner, the object 4 to be supported is held in a stable position.

It is preferred that the profiling 5, 10 on the rails 2 and the supporting parts 3 is designed such that a supporting part 3 can be placed over a rail 2 in a first as well as in a second position, wherein the supporting part is rotated over 180 degrees about a virtual axis perpendicular to the ground surface. In this manner, several supporting parts 3 can be placed over a rail 2, the high and the low sides alternately facing each other for supporting multiple objects.

The part of the supporting parts 3 that envelopes the rail 2 is provided with a blunt front and rear end. After placement of the supporting part over the rail 2, it is preferred that the rear surface and front surface are perpendicular to the longitudinal axis of the rail 2, halfway a tooth 50 or a groove 51 between two teeth 50. As a supporting part 3 placed over a rail 2 extends in the longitudinal direction of the rail 2, from a point halfway a tooth 50 or a groove 51 between two teeth 50, to a point halfway a tooth 50 or a groove 51 between two teeth 50, two supporting parts 3 can be placed against each other over a rail 2.

In a storage space, several rails 2 can be arranged parallel, side by side, for supporting, for instance, containers 4 of different lengths, or for using several rails 2 per container and thus distribute the pressure over several supporting parts 3. In addition, per rail 2, also, several supporting parts 3 can be provided, which, then, per two, face each other by the low side. In this manner, per rail 2, several containers 4 next to each other can be supported.

The rails 2 shown in FIG. 1 are further provided at the ends with a connecting part 11 for connecting the rail 2 to other rails 2. In this manner, depending on the storage space and/or the objects to be supported, the length of a rail 2 can be adapted by interconnecting several rails.

When the supporting parts 3 are placed over the rail 2, the toothings 5, 10 intermesh, and the rail 2 and supporting part 3 are positioned relative to each other and are no longer slideable in the horizontal plane. The vertical forces that are applied to the supporting parts 3 are transmitted by the supporting parts 3, directly and/or via the rail 2 in vertical direction to the base. The forces in the horizontal plane, transverse to the rail 2, are transmitted by the flanks of the supporting parts 3 to the rail 2. However, when the supporting parts 3 are loaded, most of the forces in the horizontal plane will be applied in a direction parallel to the rails 2. These forces, which are applied to the supporting part 3 through the weight of the container 4, are transmitted to the rail 2 via the intermeshing teeth 5, 10.

For transmitting forces in the longitudinal direction of the rail 2, the toothings 5, 10 are loaded on substantially one side. With regard to the toothing 10 of a supporting part 3, this is the side remote from the supporting surface 7 and, with regard to the toothing 5 of the rail 2, this is the side proximal to the supporting surface 7. The contact surface on one side of a tooth for substantially absorbing forces in the longitudinal direction of the rail, is for instance between 40 $cm^2$ and 60 $cm^2$, preferably 50 $cm^2$, at a pitch of, for instance, between 6 cm and 10 cm, preferably 8.5 cm. A supporting part 3 can be provided with, for instance, between five and ten teeth, preferably seven.

The rails 2 are provided with a toothed profile 5, whose teeth 50 are at an angle to the longitudinal direction of the rail 2. In addition, also, the passage 9 of the supporting parts 3 is provided with a toothed profile 10 for fittingly receiving the toothed profile 5 of the rail 2. In principle, also, other forms of profiling 5, 10 are possible, such as ribs in a V-shape, or the toothed profile 5, 10 of the supporting part 3 and/or the rail 2 can also be designed for engaging, with a clamping fit, the toothed profile 5, 10 of the rail 2 and/or the supporting part 3. This latter has as an advantage that once the supporting parts 3 are placed, they snap loose less easily when they are inadvertently touched, for instance during removal of a container.

As the toothing 5, 10 of a system 1 according to the invention extends over at least two sides 20, 21, 22 of the rail 2 and at least over two sides 90, 91, 92 of the passage 9 of the supporting part 3, the size of an individual tooth can remain limited and/or fewer teeth succeeding one another are required for transmitting the same force. By reducing the pitch between the teeth, the supporting parts can be positioned more accurately relative to each other.

It is preferred that, at least at the outside, the supporting parts 3 are manufactured from a recycled polyolefin material, such as polyethylene or polypropylene. In particular due to the low E-modulus of polyolefin, this material is suitable for use in the supporting parts 3. It is a relatively soft material so that the object 4 to be supported becomes damaged less rapidly. The rails 2 and the supporting parts 3 are preferably manufactured from the same material. This prevents, for instance, a harder material of a steel rail 2 from grinding into the softer material of the supporting parts 3.

As shown in FIG. 5, the rail 2 can additionally be provided with a core 12 of a type of material, for instance steel, different from the rest of the rail 2 for transmitting the forces in, substantially, longitudinal direction of the rail 2. Here, such a core 12 can then be provided with projections, for instance as a helical profiling, for ensuring a good transmission of forces on the plastic enveloping of the core 12 and for preventing the plastic from sliding down along the core 12. By providing the core 12 in an injection molding mold, the plastic part of the rail 2 can be formed around the core 12 during manufacture, and the plastic links up optimally with the relief of the core 12.

The core 12 which preferably extends over the entire length of the rail 2, can also serve, at the ends, as point of attachment for connecting parts 11 connecting the rail 2 to other rails 2. As a result, in a simple manner, the length of a rail 2 can be adapted without, for instance, welding by specialized personnel being required. The ends of, a part of, the core 12 can be provided with, for instance, screw thread. A tube, provided on the inside on both sides with screw thread can then be used as connecting part between two rails 2.

Owing to the extent of tightening, such a connecting part can, at the same time, be used for positioning the toothing 5 of the rails 2 to be connected relative to each other in the longitudinal direction. For instance, a supporting part 3 can engage, over the connecting part, both a first and a second rail 2 connected thereto. The connecting part can also be provided with means for anchoring the rail 2, which may be connected to another rail 2, to the base, for instance in that there is an attachment option for connecting the connecting part to a pin provided in the base.

In the embodiment as shown in FIG. 1, the rail 2 is provided with a toothed profile 5, whose teeth continue in a circumferential direction at an angle to the longitudinal axis of the rail 2, from one longitudinal side along the top side of the rail 2 to an opposite longitudinal side of the rail 2. As the teeth extend uninterruptedly along three sides 20, 21, 22 of the circumference, per tooth, a maximum contact surface can be obtained.

However, it is also possible that the contact surface extends along two longitudinal sides 20, 21 and the top side 22 of the rail 2, and is partly interrupted there, either for providing the rail 2 with a toothed profile 5 along at least a longitudinal side 20, 21 and the top side 22 of the rail 2, or to provide teeth 50 extending along two longitudinal sides 20, 21 from the underside as far as the top side of the rail 2.

The profile 5 can further be provided with different shapes, regarding the shape of the teeth 50 as well as the shape of the part between the teeth. For instance, the rail 2 can be provided with rectangular teeth, or a cross-section of the rail 2 at the location of a tooth and at an angle to the longitudinal axis of the rail 2 has a constant width along the direction from the base of the rail 2 to the top of the rail 2, as shown in, for instance, FIG. 1.

Further, also, a profile 5 is possible wherein a cross-section of the rail 2 at the location of a tooth, and at an angle to the longitudinal axis of the rail 2 narrows at least partly in the direction from the base of the rail to the top of the rail 2, and wherein the cross-section of the rail 2 may be wider at the base of the rail 2 than at the top of the rail 2, as the teeth shown in FIGS. 4 and 5.

In side view, the teeth of the profile 5 shown in FIG. 4 are rectangular i.e., at the location of a tooth and parallel to the longitudinal axis of the rail 2, a cross-section of the rail 2 has a constant width along the direction from the base of the rail 2 to the top of the rail 2.

In addition, in a side view of the rail 2, the teeth can also narrow, so that a cross-section of the rail at the location of a tooth, and parallel to the longitudinal axis of the rail 2, at least partly narrows in the direction from the base from the rail 2 towards the top of the rail 2, and, optionally, is wider at the base of the rail 2 than at the top of the rail 2.

The above also holds for the part of the rail 2 situated between the teeth, the grooves 51. This part of the rail 2 too can gradually taper, or, for instance, be rounded at the top side of the rail 2, so that a cross-section of the rail 2 between two teeth and at an angle to the longitudinal axis of the rail, as shown in FIG. 5, at least partly narrows in the direction from the base of the rail 2 towards the top of the rail 2, and the cross-section is optionally wider at the base of the rail 2 than at the top of the rail 2.

Narrowing of the teeth 50 and/or the parts of the rails located between the teeth 50 in a direction from the base of the rail 2 towards the top of the rail 2, as shown in the example in FIGS. 4 and 5, can simplify placing the supporting part 3 over the profile 5.

A further advantage is that due to a widening profile 5 of the rail 2 in the direction from the top of the rail 2 towards the base of the rail 2, the rail 2 transmits a relatively large part of the vertical load to the base. The profile 10 of the supporting part 3 therefore presses less hard on the base and bends sideways relative to the rail 2 less rapidly. Deflection sideways of the profile 10 of the supporting part 3 is disadvantageous because it results in reduction of the contact surface between the rail 2 and the supporting part 3.

The invention is not limited to the examples described hereinabove. After having read the above, it will be clear that other variants and embodiments are possible. For instance, an object 4 can bear in vertical direction on the rail 2, and the supporting parts 3 can offer support only in horizontal direction, or a supporting part 3 can be provided with slots or ribs that may serve as handle for holding the supporting part 3.

The term "comprising" does not exclude that one or more other elements than mentioned are present. Unless expressly stated otherwise, the use of the word "one" does not exclude that one or more of the specified elements are present.

The invention claimed is:

1. A system (1) for supporting a rollable object (4), such as a cylindrical container, comprising:
    at least one elongated rail (2) for holding at least one supporting part (3) in position in at least a longitudinal direction of the said elongated rail (2), the rail (2) having two opposite longitudinal ends and, in-between these two ends, a contact surface (6) for bearing on a base, a top side (22) located opposite said contact surface, a first longitudinal side (20) located between the top side (22) and the contact surface (6), and a second longitudinal side (21) located (a) opposite the first longitudinal side and (b) between the top side (22) and the contact surface (6), the rail (2) having an at least partly profiled surface (5) along at least two of said sides, wherein an at least partly profiled surface along the top side is defined as a surface along the top side comprising a plurality of projecting parts extending upwardly with respect to a longitudinal axis of the rail, and wherein an at least partly profiled surface along a longitudinal side is defined as a surface along a longitudinal side comprising a plurality of projecting parts extending laterally with respect to the longitudinal axis of the rail,
    and wherein the at least one rail (2) comprises an elongated and profiled core (12) from a different material from the rest of the rail (2) for absorbing forces in the longitudinal direction of the rail (2), and wherein the at least one rail (2) is provided at the ends with a connecting part (11) for connecting the at least one rail (2) to another rail (2), and wherein the connecting part (11) is connected to the elongated and profiled core (12) of the rail (2); and
    at least one supporting part (3) provided with a supporting surface (7) for preventing a movement of the object (4) in a horizontal direction, a contact surface (8) for bearing on the rail (2) and/or the base, wherein the supporting part (3) comprises a passage (9) for receiving at least a part of the rail (2), which passage (9) is at least partly defined by an inner wall of the said supporting part (3), while the passage (9) is provided with a profiled surface (10) complementary to the profiled surface (5) of the at least two sides of the rail (2), for at least partly transmitting a force applied to the supporting part in said longitudinal direction, to the rail (2).

2. A system (1) according to claim 1, wherein the at least partly profiled surface (5) of the rail (2) has a toothed profile (5), with teeth (50) and grooves (51) situated between the teeth (50), whose teeth are at an angle to the longitudinal direction of the rail (2), and the passage (9) of the supporting part (3) is provided with a toothed profile (10) for fittingly receiving the toothed profile of the rail (2).

3. A system according to claim 2, wherein the teeth of the toothed profile (5) of the rail (2) extend over at least one of said first and second longitudinal sides from said contact surface (6) of the rail (2) as far as said top side of the rail (2).

4. A system (1) according to claim 1, wherein the at least partly profiled surface (5) of the rail (2) has a toothed profile (5) for fittingly receiving the profiled surface (10) of the at least one supporting part (3) along at least one of said first and second longitudinal sides and the top side of the rail (2).

5. A system (1) according to claim 1, wherein the at least partly profiled surface (5) of the rail (2) has a toothed profile (5) for fittingly receiving the profiled surface (10) of the at least one supporting part (3) along both of said first and second longitudinal sides and the top side of the rail (2).

6. A system (1) according to claim 5, wherein the at least partly profiled surface (5) of the rail (2) has a toothed profile (5) whose teeth (50) continue in a circumferential direction, at an angle to the longitudinal axis of the rail (2) from said first longitudinal side along the top side of the rail (2) to said second longitudinal side of the rail (2).

7. A system (1) according to claim 1, wherein the profiled surface (10, 5) of the supporting part (3) and/or the rail (2) is designed for receiving the profiled surface (5,10) of the rail (2) and/or the supporting part (3) with a clamping fit.

8. A system (1) according to claim 1, wherein, when the supporting part (3) has been placed over a rail (2), the contact surface (8) of the supporting part (3) bears on the base.

9. A system (1) according to claim 1, wherein a supporting part (3) placed on the rail (2) extends in the longitudinal direction of the rail (2) from a point halfway a tooth or a groove between two teeth to a point halfway a tooth or a groove between two teeth.

10. A system (1) according to claim 1, wherein the at least one supporting part (3) is manufactured from a plastic.

11. A system (1) according to claim 1, wherein the at least one rail (2) and the at least one supporting part (3) are manufactured substantially from the same material.

12. A system (1) according to claim 1, wherein, during manufacture, the at least one rail (2) is formed around the core (12).

13. A system (1) according to claim 1, wherein the at least one rail (2) is provided with several supporting parts (3).

14. A system (1) according to claim 1, comprising at least two rails located parallel, side by side.

15. A system (1) according to claim 1, wherein the supporting part (3) is provided with a supporting surface (7) that descends from a higher side to an opposite, lower side of the supporting part (3), and the supporting part (3) has a wedge-shape.

16. A system (1) according to claim 15, wherein at least one rail (2) is provided with at least two supporting parts (3) with the low sides facing each other and the high sides facing away from each other for forming a cup-shaped opening for accommodating a rollable object (4).

17. A system (1) according to claim 10, wherein said plastic is a polyolefin material.

18. A system (1) according to claim 17, wherein said polyolefin material is polyethylene or polypropylene.

19. A system (1) according to claim 1, wherein said core (12) is made from steel.

* * * * *